United States Patent

[11] 3,566,856

| [72] | Inventor | Robert S. Linstead<br>Rockford, Ill. |
|---|---|---|
| [21] | Appl. No. | 778,980 |
| [22] | Filed | Nov. 26, 1968 |
| [45] | Patented | Mar. 2, 1971 |
| [73] | Assignee | King-Seeley Thermos Co.<br>Ann Arbor, Mich. |

[54] BARBECUE GRILL
15 Claims, 5 Drawing Figs.

[52] U.S. Cl................................................ 126/25,
108/131, 126/304, 248/188.6, 248/439
[51] Int. Cl..................................................... F16m 11/38,
F24b 3/00, F24c 15/08
[50] Field of Search............................................ 126/25, 25
(A), 9, 9 (B), 304, 304 (A), 306; 248/166, 188.6,
439; 108/130, 131

[56] References Cited
UNITED STATES PATENTS

| 2,597,477 | 5/1952 | Haislip | 126/9X |
| 2,862,777 | 12/1958 | Paige | 126/9UX |
| 2,949,209 | 8/1960 | Schott | 126/304X |

*Primary Examiner*—Charles J. Myhre
*Attorney*—Harness, Dickey & Pierce

ABSTRACT: A barbecue grill comprising a fuel containing structure defining a generally horizontally extending support surface, a pair of generally U-shaped support legs each comprising a pair of end sections and an intermediate section extending therebetween, the legs being adapted for pivotal movement between retracted positions extending generally parallel to the support surface and extended positions extending generally normal to the surface, a plurality of support brackets having generally horizontally extending support portions adapted to be fixedly secured to the surface and mounting portions extending generally perpendicular to the surface, means pivotally securing each of the leg end sections to one of the brackets, each of the brackets having an abutment flange section and a pair of detent embossments projecting from one side of the mounting portion thereof, and locking tang means provided adjacent the ends of each of the legs and adapted to be received between the abutment flanges and the adjacent of the detent embossments for releasably maintaining the legs in their respective extended positions.

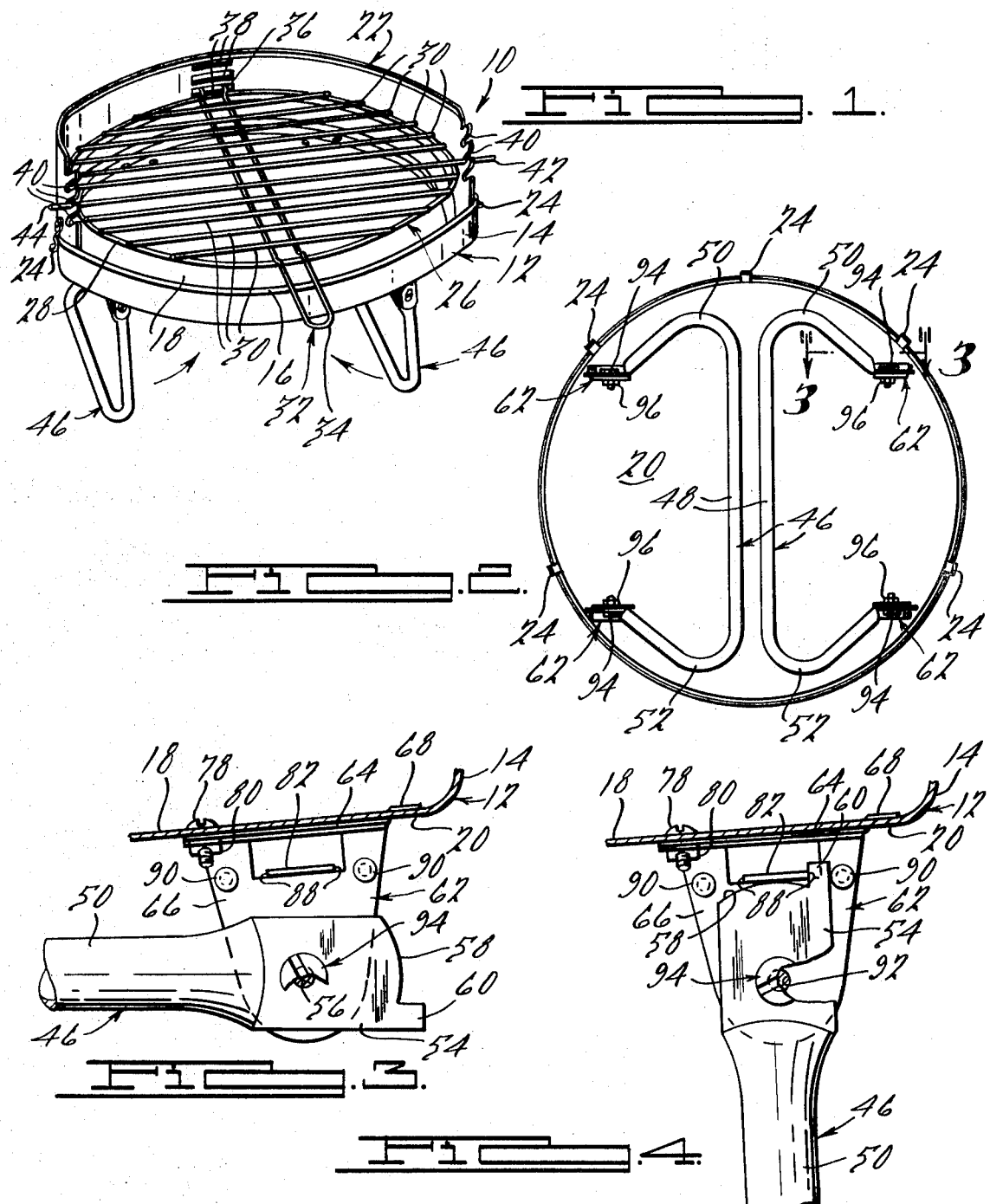

BARBECUE GRILL

SUMMARY OF THE INVENTION

This invention relates generally to barbecue grills of the type having foldable or collapsible support legs. More particularly, this invention relates to a new and improved support bracket and leg structure which are cooperable to permit the support legs of a barbecue grill to be selectively pivotably biased between a folded or retracted configuration, i.e., for storage, transport and the like, and an extended or unfolded configuration wherein the legs project downwardly to support the associated fuel supporting enclosure at a position spaced above a surface upon which the grill is mounted.

The support legs of the barbecue grill embodying the principles of the present invention are of a generally U-shaped configuration with the ends thereof being pivotably secured to a support surface defined by the lower side of the grill. Each end of each of the legs is provided with a support bracket having a first portion adapted to be fixedly secured to the support surface and a second portion adapted to be pivotably secured to the leg. In accordance with the principles of the present invention, the support brackets are provided with means defining a pair of abutment surfaces and with a pair of embossment type of detents which are spaced laterally from the abutment surfaces. Each end of each of the support legs is provided with a camming surface and with an outwardly projecting locking tang, the latter of which is adapted to be releasably received between one of the detents and the adjacent of the abutment surfaces, thereby maintaining the associated leg in its extended position. The camming surfaces are adapted to bear against the means defining the abutment surfaces and thereby coact with the locking tangs in maintaining the legs extended. By virtue of the fact that the detent embossments are provided one adjacent each of the abutment surfaces on each of the support brackets, a single bracket can be used at each end of each of the pair of support legs, thereby minimizing manufacturing and inventory costs to a minimum. An additional feature of the present invention resides in the fact that the leg support brackets are provided with a novel tab arrangement adapted to lockingly engage the bottom of the grill in a manner so as to reduce the required fastening means, i.e., screws, bolts or the like, to a minimum.

It is accordingly a general object of the present invention to provide a new and improved barbecue grill assembly.

It is a more particular object of the present invention to provide a barbecue grill incorporating a new and improved means for pivotably or foldably mounting the support legs thereof.

It is still a more particular object of the present invention to provide a barbecue grill which includes a novel means for releasably maintaining the folding or retractable legs thereof in an extended or unfolded configuration.

It is another object of the present invention to provide a new and improved barbecue grill leg construction of the above character wherein the leg support brackets incorporated therein may be mounted and secured in an extremely simple and economical manner.

It is a further object of the present invention to provide a barbecue grill assembly of the above character which is of a strong and durable construction and will therefore have a long and effective operational life.

Other objects and advantages of the present invention will become apparent from the following detailed description taken in conjunction with the accompanying drawing.

BRIEF DESCRIPTION OF THE DRAWING

FIG. 1 is an elevated perspective view of a barbecue grill embodying the principles of the present invention;

FIG. 2 is a bottom elevational view of the structure illustrated in FIG. 1 with the support legs thereof disposed in a folded or retracted configuration.

FIG. 3 is a cross-sectional view taken substantially along the line 3—3 of FIG. 2;

FIG. 4 is a cross-sectional view similar to FIG. 3 showing the support legs therein in an extended configuration; and FIG. 5 is a fragmentary cross-sectional view illustrating the mounting means used in mounting the leg support brackets of the barbecue grill of the present invention.

DETAILED DESCRIPTION OF A PREFERRED EMBODIMENT

Referring now in detail to FIG. 1 of the drawing, a barbecue grill assembly 10, in accordance with a preferred embodiment of the present invention, is shown as comprising an annular barbecue fuel supporting member or bowl, generally designated 12, having a circular peripheral sidewall section 14 that is provided with a rolled bead portion 16 at its upper edge and is integrally connected at its lower edge to a generally shallow upwardly concave bottom side section 18 that defines a support surface 20 on the lower side thereof. The bowl 12 is adapted to serve as a receptacle for conventional barbecue fuel such as charcoal, wood, coal or the like, as is commonly utilized in barbecue grills.

Extending partially around the periphery of the bowl 12 is an arcuate shroud member, generally designated 22, which is provided with a plurality of circumferentially spaced mounting clips 24 along the lower side thereof. The clips 24 are adapted to snap over the bead portion 16 of the bowl 12 and thereby support the shroud member 22 at a position wherein the same partially encloses the interior of the bowl 12. The shroud member 22 serves a heat retaining and reflecting function and is thereby preferably fabricated of a somewhat reflective sheet metal material, such as aluminum or the like, so that the head produced by combusting fuel within the bowl 12 is retained as much as possible within the confines of the assembly 10.

Together with serving the aforesaid heat retaining function, the shroud member 22 acts as a support means for a horizontally disposed grill member, generally designated 26, which is of a circular configuration and slightly smaller in diameter than the bowl 12. The grill 26 is preferably fabricated of a heavy gauge wire stock and comprises a generally ring-shaped peripheral member 28 and a plurality of spaced, parallel cross members, generally designated by the numeral 30, that are secured at their outer ends to the upper side of the member 28, as by welding or the like. Extending diametrically across the grill 26 is a handle member 32 which is also fabricated of a heavy gauge wire stock and comprises a manually engageable or grippable handle section 34 that projects outwardly from the periphery of the grill 26 at one side thereof. The opposite end of the member 32 also projects outwardly from the periphery of the member 28 and provides a support means, as shown at 36, which is adapted to be inserted within one of a series of horizontally disposed, vertically spaced slots, generally designated 38, that are provided in the shroud member 22. The ends of the member 22 are provided with a series of downwardly and rearwardly inclined pairs of horizontally aligned recesses, generally designated 40, each of which pair of recesses 40 is aligned with one of the slots 38. It will be seen that one of the cross members 30 of the grill 26 extends outwardly from the periphery of the member 28 to provide supporting end sections 42 and 44 that are adapted to be received within the pairs of recesses 40 and thereby cooperate with the support means 36 in supporting the grill 26 at a position disposed above the bowl 12. As will be apparent, the grill 26 may be positioned at various heights above the level of the burning fuel contained within the bowl 12, depending upon the heating or cooking characteristics required. By virtue of the inclined configuration of the recesses 40, when the grill 26 is properly positioned within the assembly 10, the grill 26 will not tend to be inadvertently disengaged therefrom, and in order to effect removal of the grill 26, the handle section 34 thereof must be lifted or elevated upwardly a certain amount to disengage the end sections 42, 44 from the recesses 40, at which time the entire grill 26 may be moved away from the bowl 12 by merely withdrawing the support means 36 from within its associated slot 38.

In accordance with the principles of the present invention, the grill assembly 10 is provided with a pair of foldable or collapsible U-shaped leg members, generally designated 46, which comprise intermediate sections 48 and generally arcuate-shaped end sections 50 and 52. The legs 46 are preferably fabricated of a tubular work stock and have the terminal ends of the end sections 50, 52 flattened or compressed into a generally planar configuration which define pivotal mounting portions, generally designated 54. The mounting portions 54 are each formed with a suitable opening or bore 56 adapted to receive a pivot pin or the like later to be described. The outer ends of the mounting portions 54 define generally arcuate-shaped camming surfaces 58 and outwardly projecting locking tangs 60 which are adapted to function in a manner hereinafter to be described. Generally speaking, the legs 46 are adapted to be secured to the support surface 20 in a manner such that the legs are pivotable between and extended or lowered position shown in FIG. 1, and a raised or retracted position shown in FIG. 2. Such pivotal mounting of the legs 46 is provided by a plurality of mounting brackets, generally designated 62, which are fixedly secured on the support surface 20, as best seen in FIG. 2. By virtue of the fact that each of the brackets 62 is identical in construction and operation, the following detailed description will be directed toward only one of said brackets 62, and this description will apply to each of the other of said brackets, as will be apparent.

The bracket 62 is generally L-shaped in cross section and comprises a generally horizontally disposed upper support portion 64 and a downwardly or vertically disposed mounting portion 66 which is integrally connected to the portion 64. As best seen in FIG. 5, the support portion 64 is provided with a mounting tab 68 at one end thereof which is spaced upwardly from the plane of the portion 64 and is preferably integrally connected thereto by means of a generally vertically extending web section 70. The end of the support portion 64 opposite that having the mounting tab 68 is formed with a suitable opening or bore 72 which is adapted to be aligned with a similar bore 74 in the bottom side section 18 of the bowl 12. In order to fixedly secure the bracket 62 on the support surface 20, the bracket 62 is oriented in a position wherein the support portion 64 and tab 68 thereof are generally vertically oriented, and the tab 68 is then inserted upwardly through a suitable opening 76 formed in the bottom section 18 adjacent the opening 74. The entire bracket 62 is then pivoted, for example, in a clockwise direction in FIG. 5 to a position wherein the support portion 64 is in contiguous engagement with the surface 20 and the bore 72 is aligned with the bore 74. Fastening means in the form of a suitable screw, bolt or the like 78 may then be inserted through the aligned bores 72, 74 and provided with a suitable nut 80, whereby to fixedly secure the bracket 62 in place. A particular feature of this construction resides in the fact that the bracket 62 is supported at one end thereof by means of the tab 68, and at the other end thereof by means of a single screw, bolt or the like 78, thereby minimizing to the extreme the number of fastening means, as well as the assembly time required to secure the bracket 62 in its operative position upon the support surface 20.

The mounting portion 66 of the bracket 62 is formed with a laterally outwardly extending flange 82 which is disposed in space parallel relation with the support portion 64 and may be formed simultaneous therewith by a suitable stamping operation, as will be apparent to those skilled in the art. The opposite ends of the flange 82 define abutment surfaces, generally designated 88, which are adapted to act as a stop means for lockingly securing the legs 46 in their respective extended positions, as will be described. Means in the form of a pair of detents, generally designated 90, are also provided in the mounting portion 66 of the bracket 62, which detents are adapted to cooperate with the surfaces 88 in a manner later to be described. The detents 90 are preferably provided in the form of a pair of embossments which may be stamped or similarly formed in the mounting portion 66, the embossments projecting outwardly from the same side of the mounting portion 66 as the flange 82 and being spaced from the abutment surfaces 88 thereof a distance equal to the approximate lateral width of the locking tangs 60 on the legs 46.

The lower end of the mounting portion 66 of the bracket 62 is formed with a suitable opening or bore 92 which is adapted to be aligned with the bore 56 in the associated mounting portion 54 of the legs 46 and thereby receive means in the form of a suitable pivot pin, rivet, screw, bolt or the like 94 and nut 96, whereby to pivotably secure the mounting portion 54 of the legs 46 to the mounting portion 66 of the associated bracket 62. It will be noted that the mounting portion 54 is pivotably mounted to the brackets 62 on the same sides thereof from which the flanges 82 and detents 90 are formed, whereby the abutment surfaces 88 and detents 90 may cooperate with the camming surfaces 58 and locking tangs 60 in a manner hereinafter described in releasably maintaining the legs 46 in their respective extended positions.

In operation, the legs 46 will usually assume the folded or retracted configuration shown in FIGS. 2 and 3 during such time as the grill configuration; 10 is being stored or transported. When it is desired to prepare the assembly 10 for use, the legs 46 are pivoted or unfolded downwardly, about the pivotal axes defined by the pivot pins or the like 94. As the legs 46 are thus moved from the retracted position shown, for example, in FIG. 3, to the extended or unfolded position shown in FIG. 4, the camming surfaces 58 defined on the ends of the leg mounting portions 54 frictionally engage the lower sides of the flanges 82, and simultaneously, the locking tangs 60 snap over the detents 90 and into engagement with the adjacent of the abutment surfaces 88, at which time the locking tangs 60 are releasably retained between the detents 90 and abutment surfaces 88. Thus, the camming surfaces 58 are frictionally engaged with the underside of the flanges 82 and cooperate with the locking tangs 60 which are interposed between the abutment surfaces 88 and detents 90 to maintain the legs 46 in their extended configuration. At such times as it is desired to refold the legs 46 to the retracted positions shown in FIGS. 2 and 3, the legs 46 are merely pivoted inwardly, at which time the locking tangs 60 will snap over the detents 90 and the camming surfaces 58 will become disengaged from the underside of the flanges 82.

A particular feature of the present invention resides in the fact that each of the brackets 62 is provided with a pair of detents 90, each of which pair is disposed one adjacent each of the abutment surfaces 88. With this construction, the brackets 62 are symmetrical and thus the same bracket 62 may be used in operative association with each of the end sections 50 and 52 of each of the legs 46. Accordingly, four identical brackets may be used in the assembly 10, instead of different brackets at each end of each of the legs 46. This feature will, of course, reduce manufacturing expenses, as well as attendant inventory and assembly costs.

It will be seen from the foregoing description that the present invention provides a new and improved barbecue grill assembly which is characterized by a novel leg mounting assembly that is not only easy to assemble and economical to manufacture, but also minimizes to the extreme the number of required component parts. By virtue of the fact that the barbecue grill of the present invention is of an extremely simple design and durable construction, it will have a long and effective operational life.

While it will be apparent that the preferred embodiment illustrated herein is well calculated to fulfill the objects above stated, it will be appreciated that the present invention is susceptible to modification, variation and change without departing from the proper scope or fair meaning of the subjoined claims.

I claim:

1. In combination in a leg mounting assembly:
   means defining a support surface;

a leg adapted to be mounted on said surface for pivotal movement between a retracted position extending generally parallel to said surface and an extended position extending generally normal to said surface;

a bracket having a support portion adapted to be fixedly secured to said support surface and a mounting portion extending generally perpendicular to said surface;

means pivotably securing one end of said leg to said mounting portion of said bracket;

abutment means projecting between said mounting portion of said bracket and said leg;

detent means provided between said bracket and said leg and at a position spaced from said abutment means; and locking tang means movable relative to said first mentioned means in response to pivotal movement of said leg and adapted to be received between said abutment means and said detent means for releasably maintaining said leg in said extended position.

2. An assembly as set forth in claim 1 wherein said detent means comprises an embossment formed in said mounting portion of said bracket and extending outwardly from one side thereof.

3. An assembly as set forth in claim 2 wherein said abutment means comprises a flange portion formed on said bracket and extending outwardly therefrom in the same direction as said embossment.

4. An assembly as set forth in claim 1 wherein said locking tang means comprises a tang member secured to said leg and adapted to be pivoted therewith relative to said first-mentioned means.

5. An assembly as set forth in claim 1 wherein said abutment means comprises a flange extending outwardly from one side of said mounting portion of said bracket, wherein said detent means comprises a pair of embossments formed in said mounting portion one adjacent each side of said flange, and wherein said locking tang means is adapted to be received between either of said embossments and said flange for releasably maintaining said leg in said extended position.

6. An assembly as set forth in claim 1 which includes mounting means for fixedly securing said bracket support portion to said support surface, said mounting means including a tab portion provided on said bracket and adapted to be inserted through an opening in said surface.

7. An assembly as set forth in claim 6 wherein said mounting means comprises a tab extending generally parallel to said support portion and spaced outwardly therefrom, said tab being insertable through said opening in said surface and being cooperable with fastening means extending between said surface and said support portion for fixedly securing said bracket to said surface.

8. An assembly as set forth in claim 5 which includes camming means engageable with said flange.

9. In combination in a barbecue grill assembly:

a fuel containing structure defining a support surface;

a generally U-shaped support leg comprising a pair of end sections and an intermediate section extending therebetween;

said leg being adapted for pivotal movement between a retracted position extending generally parallel to said support surface and an extended position extending generally normal to said surface;

a pair of spaced support brackets having support portions adapted to be fixedly secured to said surface and mounting portions extending generally perpendicular to said surface;

means pivotally securing each of said end sections of said leg one to one of said support brackets;

each of said brackets having an abutment flange section projecting from one side of said mounting portion thereof;

each of said brackets also having detent means provided thereon at positions spaced from said flange sections thereof; and locking tang means provided adjacent said end sections of said leg and movable relative to said structure upon pivotal movement of said leg and adapted to be received between said abutment flanges and said detent means on said brackets to releasably maintain said leg in said extended position.

10. An assembly as set forth in claim 9 wherein said detent means comprises an embossment formed in said mounting portion of said bracket and extending outwardly from one side thereof.

11. An assembly as set forth in claim 10 wherein said flange extends outwardly from said mounting portion of said bracket in the same direction as said embossment.

12. An assembly as set forth in claim 9 which includes a pair of embossments formed on said mounting portion of each of said brackets, said flanges being disposed between said embossments of each of said pairs thereof, and wherein said locking tang means is adapted to be received between either of said embossments of each of said pairs thereof and the adjacent of said flanges for releasably maintaining said leg in said extended position.

13. The invention as set forth in claim 9 wherein each of said support brackets comprises a first portion adapted to be attached to the support surface and a second portion connected to the support leg, tab means disposed in spaced parallelism with respect to said first portion of each of said support brackets and fixedly connected to one end thereof and adapted to extend through an opening in the structure and engage said structure on the side thereof opposite said surface and thereby secure said one end of said first portion of each of said brackets to said structure, and fastening means extending through aligned openings in said structure and in the opposite ends of said first portions of each of said support brackets for securing said opposite ends to said structure.

14. In combination in a support assembly for an object:

a support leg adapted for pivotal movement between a retracted position and an extended position;

means on the object defining a mounting element projecting away from the object;

means pivotably securing one end of said support leg to said mounting element;

first abutment means extending from said mounting element;

second abutment means extending from said mounting element at a position spaced from said first abutment means;

locking means movable relative to said mounting element in response to pivotal movement of said support leg and including interposable means adapted to be interposed between said first and second abutment means; and said locking means including means frictionally engageable with one of said abutment means when said leg is disposed in said extended position and thereby being cooperable with said interposable means and for releasably maintaining said leg in said extended position.

15. In combination in a support assembly for an object:

a first support member adapted for pivotal movement between a retracted position and an extended position;

a second support member adapted to be fixed relative to the object;

means pivotably securing one end of said first member to said second member;

first abutment means extending from one of said member;

second abutment means extending from one of said members at a position spaced from said first abutment means;

locking means on one of said members movable relative to the other of said members in response to pivotal movement of said first member and including interposable means adapted to be received between said first and second abutment means; and said locking means including means frictionally engageable with one of said abutment means when said leg is disposed in said extended position and thereby being cooperable with said interposable means and for releasably maintaining said leg in said extended position.